April 1, 1952     J. YANIK     2,591,328
HONEYCOMB
Filed Oct. 25, 1949
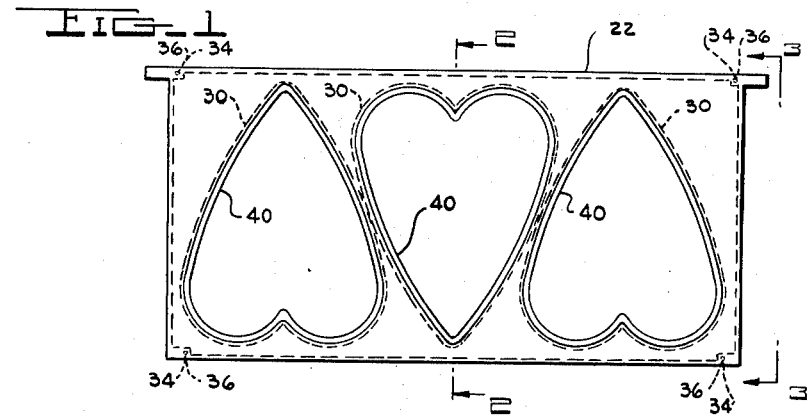
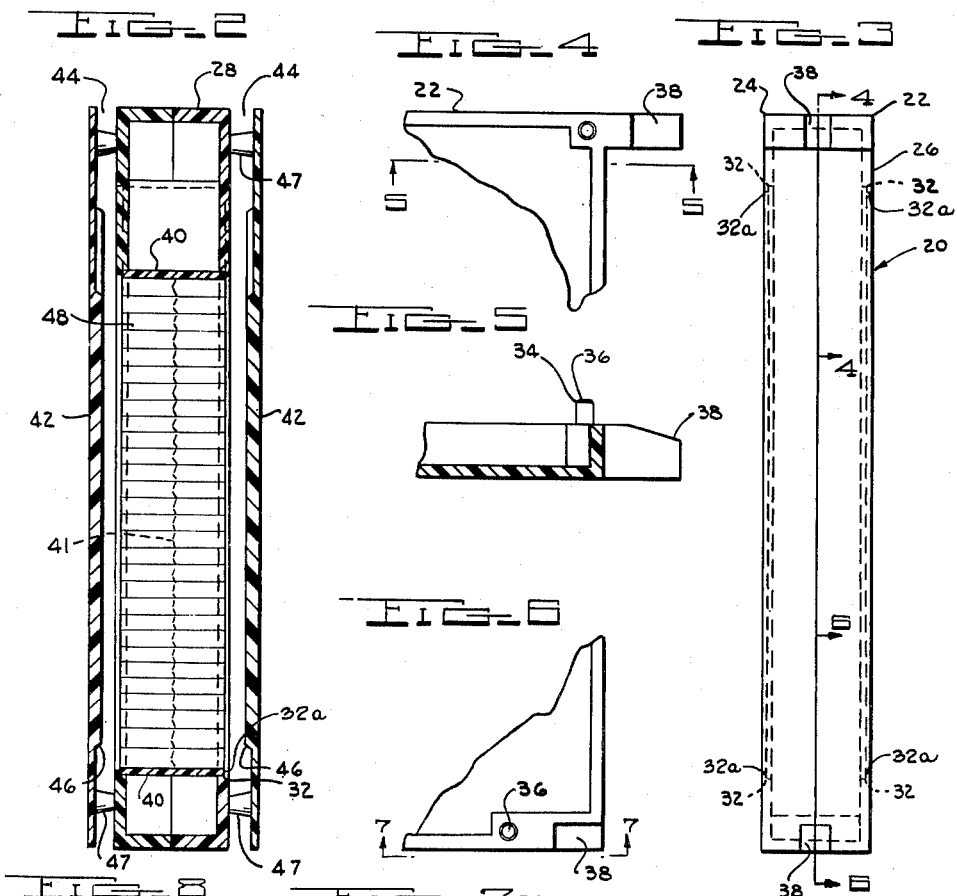
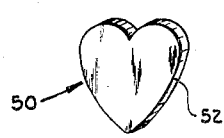
INVENTOR.
JOHN YANIK
BY
*Arthur M. Smith*
ATTORNEY Patented Apr. 1, 1952

2,591,328

UNITED STATES PATENT OFFICE 2,591,328

HONEYCOMB

John Yanik, Detroit, Mich.

Application October 25, 1949, Serial No. 123,447

7 Claims. (Cl. 6—10)

The present invention relates to new and useful structures for use in bee hives in the production of comb honey. The invention is particularly useful in producing comb honey in novel and ornamental forms adapted to permit attractive packaging as a means of stimulating sales thereof.

Heretofore, it has been the general practice in producing comb honey to construct the component parts of a bee hive of wood. The sections in which honeycombs are formed, are held within frames and are made from four strips of wood which are joined together at their ends by mortise and tenon joints to form the four sides of a box-like structure open at its face and back. When the sections are filled with honeycomb they are removed from the frames in the hives and shipped to the market where the comb honey is sold in the open face and back section as originally formed. After the sections filled with honeycomb have been removed from the frames in the hives, the remaining component parts of the bee hives, together with new wooden sections placed in the frames, are used again for the production of additional comb honey.

Such prior practices in producing and selling comb honey have not been entirely satisfactory. The finished product, when ready for market, does not have an attractive or ornamental appearance. The wood sections, which serve as the sides for the comb honey, are light and fragile and are easily damaged. When the sections are damaged, individual cells of the honeycomb are broken and the sticky honey drips from the section. Also, the frames and fences of the hive, being made of wood, will readily warp during sterilizing or when subjected to moisture. Any warpage of the frames and fences results in the sections being filled in an uneven manner. Since the edge portions of the sections are not covered by the frames, the bees leave deposits of propolis on the edges of the sections and this gives the filled sections an unsatisfactory appearance and prevents ready sealing of the section at its edges by a face and back cover secured to the side edges of the sections.

In my present invention, I have made the frames, sections and fences from a plastic material. The sections are formed in any desired ornamental shape, one form of which is here shown as a valentine heart, and are constructed so that the bees are forced to work on the honeycomb in the section while the face and back side edges of the section are covered by the frame. Fences and guides are provided to direct the bees so as to secure a filling of the section slightly below the side edges thereof. The sections so formed and filled permit the filled sections to be sealed by suitable covers secured to the edge portions of the sections and extending over the face and back portions of the filled honeycomb section. Frames embodying my invention also are so constructed that the frame portions may be readily parted and the filled sections removed therefrom without damage to the sections or the honeycomb therein.

It is a primary object of the present invention to provide bee hive structures for use in the production of comb honey whereby the comb honey is produced in novel and ornamental forms adapted to permit attractive packaging thereof.

It is another object of the present invention to provide bee hive structures for use in the production of comb honey whereby the bees in building the honeycombs within the honeycomb sections are guided to fill the sections neatly and are prevented from forming undesired deposits on the edges of the sections.

It is still another object of the present invention to provide bee hive structures of suitable design and material for use in the production of comb honey whereby the honeycomb sections, when filled with honeycomb, can be removed without damage to the honeycomb and said structures will not be deformed by natural conditions or in the ordinary use thereof.

A still further object of the present invention is to provide novel and ornamental packages of honey which are attractive and neat and are adapted to stimulate sales thereof.

Other objects of this invention will appear in the following description and appended claims, reference being had to the accompanying drawings forming a part of this specification wherein like reference characters designate corresponding parts in the several views.

In the drawings:

Fig. 1 is a vertical elevation of a frame having three shaped apertures for receiving shaped honeycomb sections and showing three such sections positioned therein.

Fig. 2 is a cross section of the frame and center section taken on line 2—2 of Fig. 1 and also a cross section of a frame.

Fig. 3 is a side elevation of the frame shown in Fig. 1.

Fig. 4 is an enlarged fragmentary view of the frame taken on the line 4—4 of Fig. 3.

Fig. 5 is a fragmentary sectional view of the frame taken on the line 5—5 of Fig. 4.

Fig. 6 is an enlarged fragmentary view of the frame taken on the line 6—6 of Fig. 3.

Fig. 7 is a fragmentary view of the frame taken on the line 7—7 of Fig. 6.

Fig. 8 is a perspective view of a package of honey embodying the invention.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the accompanying drawings, one form of my invention is shown. For the purpose of describing my invention, I have shown it as applied to heart shaped honeycomb sections by way of example. Such a shape was selected for such description because of its general use for Valentine Day and the like. It is to be understood, however, that any other desired ornamental form may be used in place of such heart shape section without departing from the scope of the present invention.

Frame 20 for holding the sections, is made up of male and female frame portions 22 and 24 respectively. The male frame portion 22 is shown as having a front wall 26 and a rearwardly extending peripheral flange 28. The front wall 26 has three apertures 30 therein. About the inner edge of each of the apertures 30 is a recessed portion 32, which can be seen more clearly in Figures 2 or 3. The frame 20 being recessed provides overlapping portions or extensions 32a, and the recessed portions 32 together with their associated extensions 32a are adapted to receive and overlie the edge portions of a section or box 40 as will be described below.

The male and female frame portions 22 and 24 are held together in alignment by means of four pins 34 located in the corners of the male frame portion 22 and four corresponding drilled holes 36 in the corners of the female frame portion 24. The pins 34 and their corresponding holes 36 are constructed to provide a close mating fit. The male and female frame portions 22 and 24 can be separated by the application of a wedging force applied substantially equally to the beveled edges 38 on the adjacent four corners thereof which will separate the male and female frame portions 22 and 24 without strain on the filled sections and permit the ready removal of such sections without rupture of the comb. However, the frame portions may be separated in any other preferred manner so long as substantially equal pressure is exerted at the adjacent surfaces thereof.

Sections or boxes 40 are provided of any suitable shape and size, corresponding to the shape and size of the recessed portions 32 to provide a tight fit when the male and female frame portions 22 and 24 are fitted together with the sections in position therebetween so that the ends of the sections 40 are abutting the extensions 32a. Any suitable edible foundation 41 is secured within each of the sections, as shown in Figure 2 to assist the bees in building straight honeycombs therein.

A fence or spacer 42 is provided adjacent the ends of sections 40 to provide a beeway 44 therebetween. The fence or spacer 42 has a plurality of portions 46, which are positioned opposite from and normal to the ends of each of sections 40, and extend in the direction of the section.

Each portion 46 has the same contour as the end of the section opposite from it and is beveled on its edges to form a clearance between it and the edges of the section, thus providing a bee guide which allows the bees to enter the section but prevents them from building the comb 48 in the section to a height above a horizontal plane intersecting the face and back edge portions of the section.

To insure proper spacing between the portions 46 and the sections 40, spacing pins 47 are provided on the fence or spacer 42 for contact with the adjacent frame 20. It is to be understood, however, that other suitable means for spacing the fence or spacer 42 from the fame 20 may be employed.

The section 40, fence 42 and frame 20, which are internal members of the bee hives, are preferably constructed from any desirable type of plastic material which will not have a repellent effect on the bees. Constructing the internal members of the bee hive from plastic materials has proved to be very satisfactory, because the internal members can be boiled in water to clean and sterilize them and may be used in any kind of weather without causing warping thereof. It is very important in carrying out the present invention, that these members retain their original shapes so that the bees will be guided to fill the sections with honeycomb in the desired manner to give an attractive appearance to the finished article.

The use of plastic materials for the internal members of the bee hive has also proved very satisfactory in making sections 40 heart shaped, as shown in the drawings, or in any other desired ornamental shape.

In operation, each of the group of sections is first provided with a comb foundation 41. The sections are then placed within frames 20 and several of the frames 20 are placed in parallel relationship in the hive. Between each of the frames 20 is placed a fence or spacer 42. The fence with its protruding portion 46 and spacing pins 47 forms beeways 44 and limits the filling of sections 40 so that neat honeycombs of a predetermined height will be formed. When the honeycombs fill the sections 40, the frames 20 are removed from the hives and the frame portions 22 and 24 are carefully separated and the sections removed. Suitable plastic covers or the like, are then placed over the face and back portions of the honeycomb and are sealed to the clean edges of the section whereby a package of comb honey ready for market has been prepared.

An ornamentally shaped package 50 of comb honey is shown in Figure 8 of the drawing. The ends of the package are sealed by plastic covers 52. This package 50 is sturdy in construction to prevent damage thereof and presents an article for sale that is attractive in appearance and in which the comb honey is safe from contamination because of the sealed condition thereof.

Having thus described my invention, I claim:

1. A holding frame for honeycomb section comprising a forward frame portion and a rearward frame portion, said forward frame portion including a front wall and a rearwardly projecting peripheral flange, said forward wall having an aperture therein and a recessed portion about the rearward edge of said aperture, said rearward frame portion including a rear wall and a forwardly projecting peripheral flange adapted to abut said rearwardly projecting peripheral flange, said rear wall having an aperture therein and a recessed portion about the forward edge of said aperture adapted to receive and hold in cooperation with the recessed portion in said forward wall a honeycomb section, said forward and rearward frame portions having mating means for holding the abutting peripheral flanges together and additional means adapted to be used to permit uniform parting of said abutting peripheral flanges.

2. In combination, the holding frame as defined in claim 1, and a fence having a projecting portion thereon conforming to the shape of said front wall aperture and in juxtaposition therewith whereby the outward extension of the honeycomb can be limited.

3. A holding frame for honeycomb sections comprising a forward frame portion and a rearward frame portion, said forward frame portion having a front wall with an aperture therein and a recessed portion about the rearward peripheral edge of said aperture, said rearward frame portion having a rear wall with an aperture therein and a recessed portion about the forward peripheral edge of said aperture, said recessed portions being oppositely disposed to one another whereby a honeycomb section may be retained between the recessed portions, said forward and rearward frame portions having mating means for holding said frame portions together and additional means adapted to be used to separate said frame portions without twisting of one frame portion relative to the other whereby a honeycomb section may be removed from said holding frame without damaging said honeycomb section or honeycomb therein.

4. In combination, the holding frame as defined in claim 3, and a fence having a projecting portion thereon conforming to the shape of said front wall aperture and in juxtaposition therewith whereby the outward extension of the honeycomb can be limited.

5. In combination, a holding frame for honeycomb sections comprising two complementary frame portions separably joined together, each frame portion having an aperture for receiving an end of a section and an extension for overlapping said end of a section, and a fence having a projecting portion conforming to the shape of one of said apertures, said projecting portion being in juxtaposition with said aperture, whereby the outward extension of the honeycomb can be limited.

6. A holding frame for honeycomb sections comprising two complementary frame portions separably joined together and having oppositely disposed apertures, said frame portions being recessed around the edges of said apertures so that extensions are formed which project radially inwardly to overlap the ends of a section received in the recesses of said frame portions.

7. In combination, a holding frame for honeycomb sections having an aperture with the edge thereof recessed to form an extension for overlapping one end of a section received in the recessed edge of said aperture, a fence having a projecting portion conforming to the shape of one of said apertures, and means for spacing said projecting portion a predetermined distance from said frame whereby the outward extension of the honeycomb can be limited.

JOHN YANIK.

REFERENCES CITED

The following references are of record in the file of this patent:

UNITED STATES PATENTS

| Number | Name | Date |
| --- | --- | --- |
| 176,347 | Perrine | Apr. 18, 1876 |
| 1,073,459 | Anderson | Sept. 16, 1913 |
| 1,195,990 | Hunter | Aug. 29, 1916 |
| 1,992,664 | Hanson | Feb. 26, 1935 |
| 2,146,844 | Panei | Feb. 14, 1939 |
| 2,452,174 | Arnold | Oct. 26, 1948 |
| 2,491,423 | Snyder | Dec. 13, 1949 |